March 27, 1962   J. J. O'CONNELL   3,026,688
CONTROLS FOR TWO-COMPARTMENT REFRIGERATOR
Filed Jan. 23, 1961
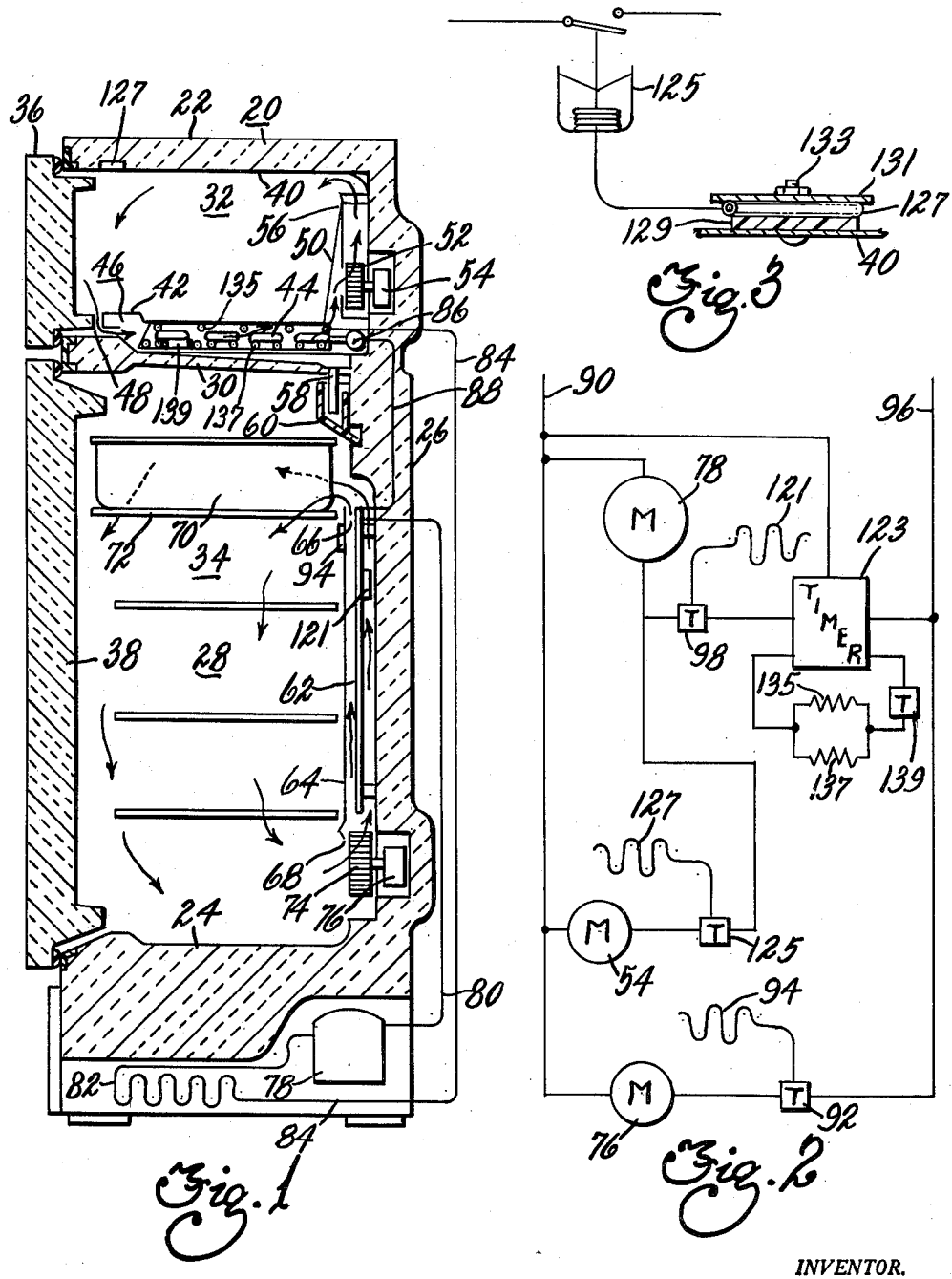
INVENTOR.
JOHN J. O'CONNELL
BY
HIS ATTORNEY United States Patent Office 3,026,688
Patented Mar. 27, 1962

3,026,688
CONTROLS FOR TWO-COMPARTMENT
REFRIGERATOR
John J. O'Connell, Dayton, Ohio, assignor to General
Motors Corporation, Detroit, Mich., a corporation of
Delaware
Filed Jan. 23, 1961, Ser. No. 84,377
3 Claims. (Cl. 62—178)

This invention pertains to refrigerating apparatus and more particularly to two-compartment household refrigerators cooled by separate evaporators in series.

When two-compartment refrigerators are cooled by separate evaporators connected in series, it is difficult to maintain desirable temperatures in each compartment through all ambient temperatures. In one aspect, the heat leak is not in the same proportion throughout since, at low ambient temperatures, the temperature difference for the colder compartment may be twice as great as the temperature difference for the warmer compartment. At high ambient room temperatures, the temperature difference for the colder compartment may be only one and a half times as great as the temperature difference for the warmer compartment. Since it is customary to cycle the refrigerating system in response to the temperature of the evaporator in the warmer compartment because of its proportionately lower heat leak at high ambient room temperatures, the temperature of the colder compartment becomes colder than necessary and often causes the system to operate continuously when adequate refrigerating temperatures are maintained.

It is an object of this invention to prevent the colder compartment of a two-compartment household refrigerator from becoming abnormally cold.

It is another object of this invention to prevent the refrigerating system of a two-compartment household refrigerator from running continuously when refrigerating temperatures are substantially satisfied.

These and other objects are attained in the form shown in the drawings in which a two-compartment refrigerator cabinet is provided with an upper below-freezing compartment and a lower above-freezing compartment separated by a horizontal insulated wall. These two compartments are cooled by separate evaporators with a first evaporator in the series cooling the below-freezing compartment and the second evaporator in the series cooling the above-freezing compartment. Separate fans and motors are provided for circulating the air between the evaporators and the respective compartments. The operation of the compressor condenser unit is controlled by a wide differential thermostat mounted in heat transfer with the second evaporator in the series.

Under high ambient room temperatures, when the load on the motor-compressor unit is greatest, there is a tendency to provide excess cooling and abnormal low temperatures for the below-freezing compartment without causing the thermostat located on the second evaporator in the series to cycle or stop the motor-compressor unit. To prevent this, I provide a thermostat responsive to the temperature of the below-freezing compartment and connected in series with the fan for the below-freezing compartment to stop the fan when substantially a sufficiently low temperature is reached. This causes the motor-compressor condenser unit to cycle and prevents excessive running time.

Further objects and advantages of the present invention will be apparent from the following description, reference being had to the accompanying drawings wherein a preferred embodiment of the present invention is clearly shown.

In the drawings:

FIGURE 1 is a transverse vertical sectional view embodying one form of my invention;

FIGURE 2 is a wiring diagram for the refrigerating system shown in FIGURE 1; and FIGURE 3 is a fragmentary view, partly diagrammatic and partly in section, illustrating the control for the freezer fan.

Referring now to the drawings and more particularly FIGURE 1, there is shown an insulated refrigerator cabinet 20 including the top wall 22, a bottom wall 24, a rear wall 26, side walls 28 and a horizontal insulated partition wall 30 dividing the interior of the cabinet into an upper below-freezing compartment 32 and a lower above-freezing compartment 34. The cabinet 20 is provided with an upper insulated front door 36 for the below-freezing compartment 32 and a lower insulated front door 38 for the above-freezing compartment 34.

The top, bottom, rear and sides of the below-freezing compartment 32 are enclosed by a metal liner 40. The bottom of this compartment is provided by a false sheet metal wall 42 which rests on top of a vertically-finned refrigerant evaporator 44 located in an evaporator compartment 46 beneath the false bottom wall 42. An entrance inlet 48 is provided beneath the front of the false bottom wall 42 for entrance of air from the below-freezing compartment 32 to the evaporator compartment 46. A shroud 50 connects with the rear of the evaporator compartment 46 and conducts the air to a centrifugal fan 52 driven by the electric motor 54. The fan 52 draws the air through the evaporator compartment 46 in heat transfer with the evaporator 44 and discharges the air htrough the discharge outlet 56 back into the compartment 32. The evaporator compartment 46 is located in the hollow portion of the insulated partition wall 30 and is provided with a drain 58 which drains any frost water through a trap 60 onto the rear wall 26 of the above-freezing compartment 34.

Mounted upon the rear wall of the above-freezing compartment 34, but spaced therefrom, is a vertical plate evaporator 62 connected to the outlet of the first evaporator 44. It is spaced from the rear wall 26 which is hollowed out for receiving this evaporator 62. In front of the evaporator 62 is a false rear wall 64 which has an outlet opening 66 substantially at the top of the evaporator 62 and an inlet opening 68 at the bottom of the evaporator 62. The outlet opening 66 is directly behind the meat container 70 located upon the upper shelf 72 within the compartment 34. Air is drawn from the compartment 34 by a centrifugal fan 74 driven by the electric motor 76 which moves the air upwardly around the plate evaporator 62 between the false wall 64 and the rear wall 26 and discharges the air cooled by the evaporator 62 through the outlet 66 around the meat container 70.

Beneath the bottom wall 24 is the sealed motor-compressor unit 78 which withdraws evaporated refrigerant from the second evaporator 62 through the suction conduit 80 and forwards the compressed refrigerant to a condenser 82 from which the liquid refrigerant is delivered through a capillary tube restrictor supply conduit 84 to the inlet of the evaporator 44. The outlet of the evaporator 44 is provided with an accumulator 86 which is connected by the conduit 88 to the inlet of the second evaporator 62. The accumulator 86 serves as a liquid trap to prevent the draining of liquid refrigerant from the first evaporator 44 so that only the surplus of liquid refrigerant is fed to the second evaporator 62.

As shown in the wiring diagram, FIGURE 2, the supply conductor 90 connects to one terminal of the sealed motor-compressor unit 78 and each of the fan motors 54 and 76. The fan motor 76 may operate continuously, if desired, but preferably it has connected in series with it a cycling thermostatic switch 92 controlled in accordance with the temperature of a thermostat bulb 94 mounted upon the false rear wall 64 adjacent the discharge outlet 66. The thermostat 92 connects to the second supply conductor 96. The thermostatic switch 92 cycles the fan motor 76 so as to keep the compartment 34 at a temperature of about 36° F. The meat container 70, however, is maintained at a temperature of about 30° F.

The operation of the motor-compressor unit 78 as well as the fan motor 54 and the fan 52 is normally controlled by a cycling thermostatic switch 98 connected in series with both of these electric devices 78 and 54. This cycling thermostatic switch 98 is controlled by and connected to a thermostat bulb 121 which is mounted upon the rear face of the plate evaporator 62 with a thin spacer of plastic material intervening in a manner similar to that shown in FIGURE 3. This switch 98 preferably is set to operate upon a wide differential cycle, for example, with a switch closing temperature of about 37.5° F. and switch opening temperature of about 7° F. This switch 98 is connected through the normally closed contacts of the timer 123 with the second supply conductor 96.

In this system, the reduced liquid refrigerant flow to the second evaporator 62 and shorter cycles are relied upon to maintain the proper temperatures in both compartments and, particularly, to prevent the above-freezing compartment 34 from becoming too cold. However, in warm ambient room temperatures, the below-freezing compartment 32 becomes colder than is desired or is necessary, such as, for example, —5° F. when 0° F. would be adequate. Frequently, the second evaporator 62 never becomes cold enough under such conditions to open the switch 98, thus resulting in continuous operation of the sealed motor-compressor unit 78. This results in excessive current consumption and provides a wider fluctuation in temperature of the below-freezing compartment 32.

According to my invention, as shown in FIGURES 1 to 3, I provide in series with the fan motor 54 a cycling thermostatic switch 125 connected to and operated in accordance with the temperature of a thermostat bulb 127 mounted upon but partially insulated by the plastic spacer 129 from the top of the liner 40 of the below-freezing compartment 32. As shown in FIGURE 1, this bulb is located at the front of the compartment 32 adjacent the door 36 so that it will immediately be influenced by the warmer temperature occasioned upon the opening of the door 36. As shown in detail in FIGURE 3, the bulb 127 is clamped by a clamping plate 131 and a bolt 133 to the liner 40. The switch 125 is preferably set to open at —1° F. and to reclose at about 10° F. When the below-freezing compartment 32 reaches a temperature of about —1° F., the switch 125 will open to deenergize the fan motor 54 and to stop the fan 52. This stopping of the fan 52 will stop the circulation of air through the evaporator 44, substantially eliminating any evaporation of refrigerant therein and providing a greater surplus of liquid refrigerant for the second evaporator 62. This results in a rapid fall in temperature of the second evaporator 62 and a fall in temperature of the thermostat bulb 121 enabling the evaporator 62 to cool the temperature of the bulb 121 to the switch opening temperature of —7° F. to stop the motor-compressor unit 78. Continuous operation of the sealed motor-compressor unit and the excessive use of current and the excessive cooling of the compartment 32 are thereby prevented. The motor 54 will not be reenergized until both the switches 125 and 98 close after there is attained the respective closing temperatures of +10° F. and 37.5° F.

The second evaporator 62 defrosts each cycle because of the temperature limits of switch 98. About once a day, the timer 123 disconnects the switch 98, including the sealed motor-compressor unit 78 and the motor 54, from the supply conductor 96 and energizes the electric heaters 135 and 137 in the evaporator compartment 46. These heaters are located in notches in the top and bottom of the fins of the evaporator 44. A defrost limiter thermostat 139, mounted upon the evaporator 44 and connected in series with the heaters 135 and 137, prevents the overheating of the evaporator 44. After the defrosting period, the circuit is returned to the normal condition by the timer 123 which reconnects the switch 98 with the supply conductor 96 to restore to normal the operation of the sealed motor-compressor unit 78 and the fan motor 54. The fan motor 76 and the fan 74 are not affected by the timer 123.

Thus, by the addition of the fan switch as shown in FIGURE 3, excessive fluctuation of temperatures and, particularly, excessive low temperatures are prevented for the below-freezing compartment 32 and, in addition, continuous operation of the sealed motor-compressor unit 78 and excessive current consumption are also prevented.

While the embodiment of the present invention, as herein disclosed, constitutes a preferred form, it is to be understood that other forms might be adopted.

What is claimed is as follows:

1. Refrigerating apparatus including an insulated cabinet enclosing separate below and above freezing compartments, first and second evaporators connected in series and individually associated respectively with said below and above freezing compartments for cooling said compartments, refrigerant liquefying means for supplying liquid refrigerant to said first evaporator and for withdrawing evaporated refrigerant from said second evaporator, fan means for circulating air from said below freezing compartment in heat transfer with said first evaporator, cycling control means responsive to the temperature of said second evaporator for controlling the operation of said liquefying means and said fan means, and thermostatic means responsive to a predetermined low temperature of said below freezing compartment for preventing the operation of said fan means.

2. Refrigerating apparatus including an insulated cabinet enclosing separate below and above freezing compartments, an evaporator compartment associated with said below freezing compartment, first and second evaporators connected in series and individually associated respectively with said evaporator compartment and said above freezing compartment, electrically operated refrigerant liquefying means for supplying liquid refrigerant to said first evaporator and for withdrawing evaporated refrigerant from said second evaporator, electrically operated fan means connected in parallel circuit with said liquefying means for circulating air from said below freezing compartment through said evaporator compartment in heat transfer with said first evaporator and back to said below freezing compartment, wide differential thermostatic cycling switch means connected in series circuit with said liquefying means and said fan means responsive to the temperature of said second evaporator, and second thermostatic switch means connected only in series with said fan means and responsive to a predetermined low temperature of said below freezing compartment for deenergizing said fan means.

3. Refrigerating apparatus including an insulated cabinet enclosing separate below and above freezing compartments, said below freezing compartment including metal wall portions, an evaporator compartment associated with said below freezing compartment, first and second evaporators connected in series and individually associated respectively with said evaporator compartment and said above freezing compartment, electrically operated refrigerant liquefying means for supplying liquid refrigerant to said first evaporator and for withdrawing evaporated refrigerant from said second evaporator, electrically operated fan means connected in parallel circuit with said liquefying means for circulating air from said below freezing compartment through said evaporator compartment in heat transfer with said first evaporator and back to said below freezing compartment, wide differential thermostatic cycling switch means connected in series circuit with said liquefying means and said fan means responsive to the temperature of said second evaporator, and second thermostatic switch means connected only in series with said fan means and having a thermosensitive element mounted on a metal wall portion of said below freezing compartment and responsive to a low temperature for deenergizing said fan means.

References Cited in the file of this patent

UNITED STATES PATENTS

| | | |
|---|---|---|
| 2,346,837 | Grooms | Apr. 18, 1944 |
| 2,912,834 | Mann | Nov. 17, 1959 |